(12) United States Patent
Dodrill et al.

(10) Patent No.: US 7,502,993 B1
(45) Date of Patent: Mar. 10, 2009

(54) CALLING SERVICE USING VOICE ENABLED WEB BASED APPLICATION SERVER

(75) Inventors: Lewis Dean Dodrill, Richmond, VA (US); David William Geen, King George, VA (US); Satish Joshi, Glen Allen, VA (US); Ryan Alan Danner, Glen Allen, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 634 days.

(21) Appl. No.: 09/604,654

(22) Filed: Jun. 27, 2000

Related U.S. Application Data (60) Provisional application No. 60/152,316, filed on Sep. 3, 1999.

(51) Int. Cl.
*G06N 3/00* (2006.01)
(52) U.S. Cl. ........................ 715/205; 715/208
(58) Field of Classification Search ................ 715/513, 715/517, 523, 530, 205, 208, 234, 243, 254; 709/209, 224, 217, 218, 200; 707/102; 370/352; 704/9, 275, 200, 270.1; 379/67.1, 71, 88.07, 379/88.13, 220.01, 900
See application file for complete search history.

(56) References Cited

U.S. PATENT DOCUMENTS

| | | | |
|---|---|---|---|
| 4,837,798 A | | 6/1989 | Cohen et al. |
| 5,903,723 A | * | 5/1999 | Beck et al. ................... 709/200 |
| 5,940,834 A | * | 8/1999 | Pinard et al. ................ 707/102 |
| 5,958,014 A | * | 9/1999 | Cave .......................... 709/229 |
| 5,991,712 A | * | 11/1999 | Martin ........................... 704/9 |
| 6,011,844 A | * | 1/2000 | Uppaluru et al. ........ 379/220.01 |
| 6,065,048 A | * | 5/2000 | Higley ......................... 709/218 |
| 6,125,391 A | * | 9/2000 | Meltzer et al. .............. 709/223 |
| 6,151,624 A | * | 11/2000 | Teare et al. .................. 709/217 |
| 6,161,008 A | * | 12/2000 | Lee et al. ..................... 455/415 |
| 6,167,448 A | * | 12/2000 | Hemphill et al. ............ 709/224 |

(Continued)

OTHER PUBLICATIONS

KDG Telemetry, "Dial-in operation for remote configuration", Sep. 20, 1998, http://www.telemetry.co.uk/dtremote.htm.*

(Continued)

*Primary Examiner*—Stephen S Hong
*Assistant Examiner*—Kyle R Stork
(74) *Attorney, Agent, or Firm*—Leon R. Turkevich; Edward J. Stemberger (57) ABSTRACT

A method is provided in an application server for executing a calling application. The method includes receiving an HTTP request for execution of a calling application operation for a caller. A selected extensible markup language (XML) document is accessed in response to reception of the HTML request. Based on the XML document, a first HTML page including prompts is generated for the caller. A directory is accessed based on an input from the caller to obtain called party information. A second HTML page is generated having instructions for contacting the called party. Hence, calling services may be deployed on a platform that is customizable, scalable, and built upon open standards such as Internet protocol. By directly contacting an application server upon picking-up a telephone device, an intelligent system is provided for making telephone calls over an IP network.

24 Claims, 4 Drawing Sheets

U.S. PATENT DOCUMENTS

| | | | |
|---|---|---|---|
| 6,181,736 B1* | 1/2001 | McLaughlin et al. | 375/222 |
| 6,243,376 B1* | 6/2001 | Ng et al. | 370/352 |
| 6,275,490 B1* | 8/2001 | Mattaway et al. | 370/352 |
| 6,366,650 B1* | 4/2002 | Rhie et al. | 379/88.13 |
| 6,377,927 B1* | 4/2002 | Loghmani et al. | 704/275 |
| 6,456,709 B1* | 9/2002 | Cox et al. | 379/218.01 |
| 6,535,896 B2* | 3/2003 | Britton et al. | 715/523 |
| 6,636,831 B1* | 10/2003 | Profit et al. | 704/275 |
| 2002/0057672 A1* | 5/2002 | Komuro | 370/352 |

OTHER PUBLICATIONS

Ascend Communications, "Setting Up IP Routing for WAN Links", 1998, http://ww.hal-pc.org/~ascend/MaxTNT/radius/ip.htm.*

"Voice Extensible Markup Language: VoiceXML," version 0.9, Aug. 17, 1999, available from: <http://www.voicexml.org/specs/VoiceXML-0.9-19990817.pdf>, pp. 1-63.*

"The American Heritage(r) College Dictionary: Fourth Edition," 2002, Houghton Mifflin Company, p. 578.*

BOS, "XML in 10 Points", W3.org (Aug. 26, 1999).

Kramer, Alex and Patricia Hallstein, "XML at Work- Introduction", May 1999, 3 pages [retrieved on Jul. 21, 2006]. Retrieved from the Internet: URL: http://www.2far.com/publications/xml/XML-Introduction.html.

Skyes, Rebecca, "IBM offers speech extension to XML", Feb. 19, 1999, 2 pages [retrieved on Jul. 25, 2006] Retrieved from the Internet: URL: http://www.cnn.com/TECH/computing/9902/19/spechm1.idg/index.html.

Webreference, XML and Perl: Embedding XML in HTML Feb. 14, 1999, 3 pages [retrieved on Jul. 21, 2006] Retrieved from the Internet: URL: http://www.webreference.com/perl/tutorial/1/.

Webreference, XML and Perl: Practical XML Feb. 14, 1999, 3 pages [retrieved on Jul. 21, 2006] Retrieved from the Internet:URL:http://www.webreference.com/perl/tutorial/1/xml.html.

Webreference, XML and Perl: Resources Feb. 14, 1999, 3 pages [retrieved on Jul. 7, 2006] Retrieved from the Internet: URL: http://www.webreference.com/perl/tutorial/1/perl.html.

Webreference, XML and Perl: Querying the file Feb. 14, 1999, 4 pages [retrieved on Jul. 21, 2006] Retrieved from the Internet: URL:http://www.webreference.com/perl/tutorial/1/code.html.

Webreference, XML and Perl: A step further Feb. 14, 1999, 4 pages [retrieved on Jul. 21, 2006] Retrieved from the Internet: URL: http://www.webreference.com/perl/tutorial/1/code2.html.

Webreference, XML and Perl: Summary Feb 14, 1999, 4 pages [retrieved on Jul. 21, 2006] Retrieved from the Internet: URL: http://www.webreference.com/perl/tutorial/1/summary.html.

* cited by examiner

CALLING SERVICE USING VOICE ENABLED WEB BASED APPLICATION SERVER

CROSS REFERENCE TO RELATED APPLICATIONS

This application claims priority from provisional application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Telephone calls can now be made over an IP network. For example, a user may via telephone can connect over a conventional public switched telephone network or a wireless network to an IP gateway which converts the conventional call to voice over IP. In this case, however, a call is made to connect to a voice application which requires the conventional "dumb" dial tone, accessing a gateway, and waiting for a connection to be made.

Use of calling services, however, still requires a user to dial into the calling services, and begin a validation session before the user can access calling services. Hence, existing voice over IP architectures rely on gatekeepers, call managers, virtual switch controllers, etc., to complete a call that requires user input during call initiation, followed by user selection inputs that specify the operation to be performed.

SUMMARY OF THE INVENTION

There is a need for an arrangement that enables users to deploy a scalable, open standards based calling service on an open standards based network such as an Internet Protocol (IP) network without requiring infrastructure elements such as call manager and/or gate agent services of conventional telephony applications.

There also is a need to facilitate user interaction with a telephony-based voice application that provides the user immediate access to multiple calling services, for example, unified message retrieval, instant messaging, personalized dialing, etc.

These and other needs are attained by the present invention, where an application server, configured for executing a calling application includes an application runtime environment configured for dynamically generating, in response to a HTTP request, a first hypertext markup language (HTML) document including prompts for input by a caller, and in response to an input from the caller, for generating a second HTML page having instructions for contacting a called party based on accessing a directory containing information regarding the called party.

Another aspect of the present invention provides a method in an application server for executing a calling application. The method includes receiving an HTTP request for execution of a calling application operation for a caller. A selected extensible markup language (XML) document is accessed in response to reception of the HTML request. Based on the XML document, a first HTML page including prompts is generated for the caller. A directory is accessed based on an input from the caller to obtain called party information. A second HTML page is generated having instructions for contacting the called party.

Hence an intelligent calling service is provided whereby, when a user picks up his or her telephone, a voice application is immediately initiated (without the convention dial tone and wait for connection) providing the user with communication choices such as accessing a call list, accessing white or yellow pages, etc., for making a call.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
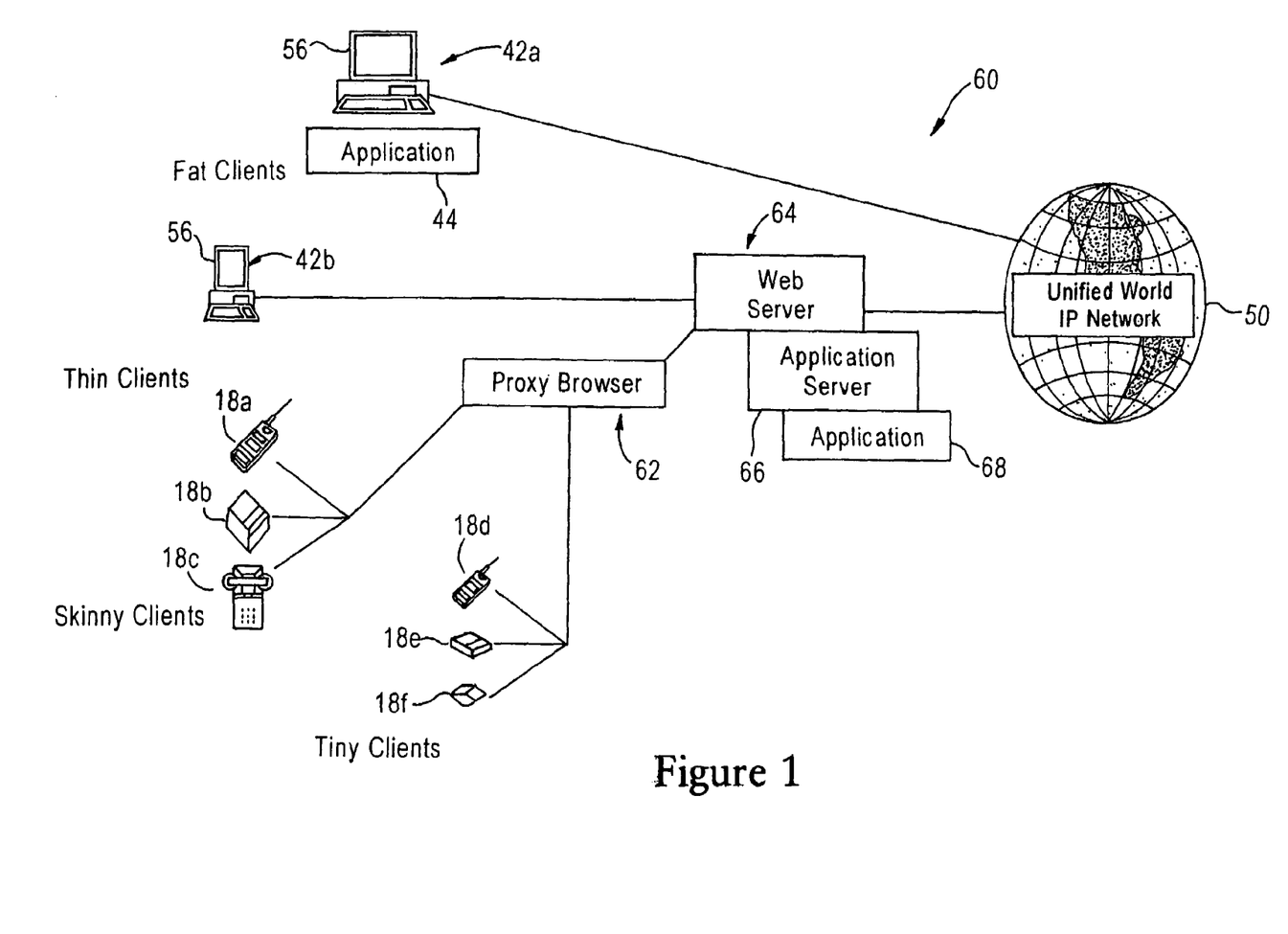
FIG. 1 is a block diagram illustrating an system enabling deployment of a calling service, capable of executing voice enabled web applications, according to an embodiment of the present invention.

FIG. 1 is a block diagram illustrating an architecture that provides calling services via an IP network using browser audio control according to an embodiment of the present invention, reproduced from FIG. 3 of the above-incorporated application Ser. No. 09/480,485. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the messaging network 60.

Figure 2:
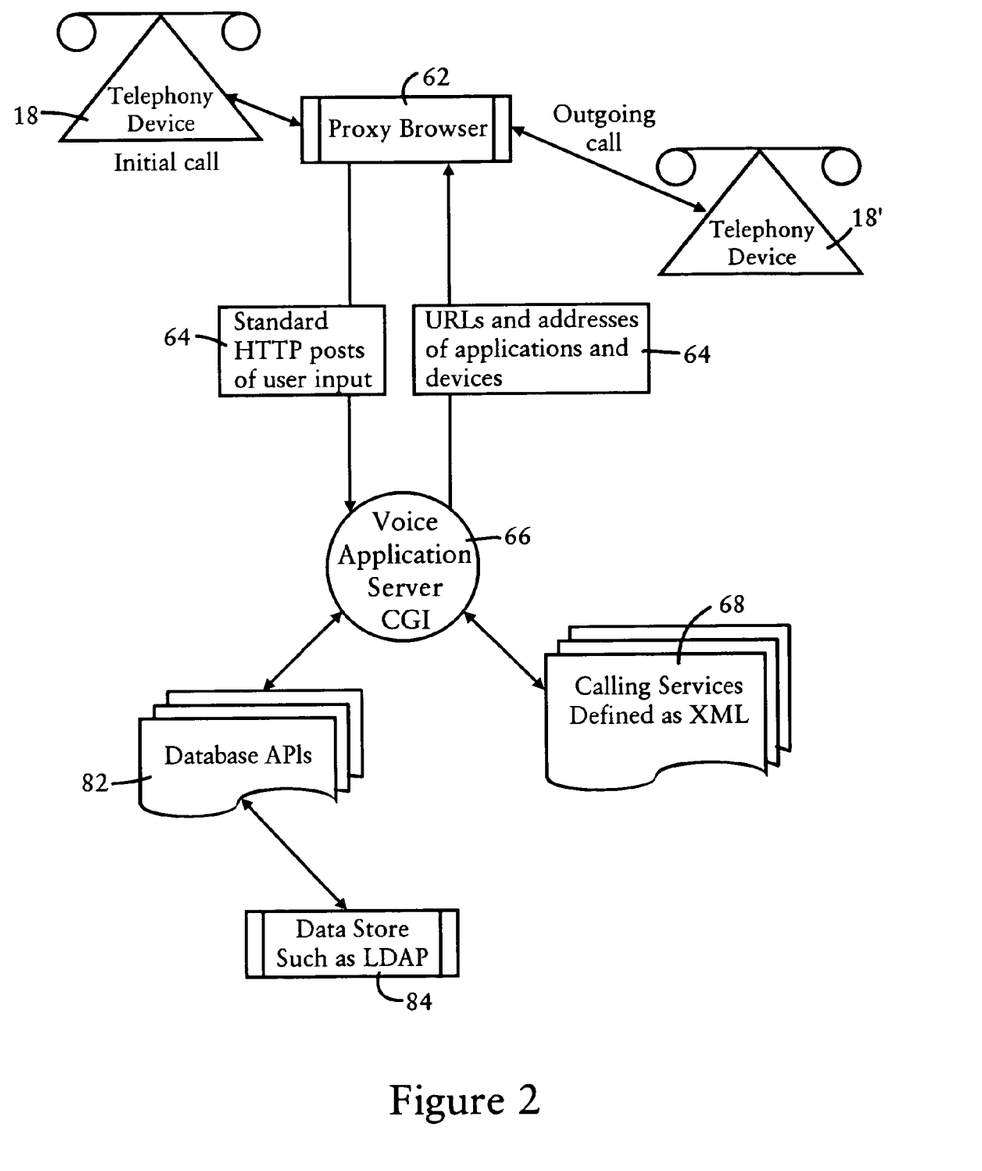
FIG. 2 is a diagram illustrating interactions by an application server of FIG. 1 with resources via an IP network for execution of calling services according to an embodiment of the present invention.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI) as illustrated in FIG. 2, by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages 68 (i.e., XML pages that define an application) and in response generates new HTML pages having XML tags during runtime and supplies the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

FIG. 2 is a diagram illustrating in further detail the calling service implemented by the voice application server 66 according to an embodiment of the present invention. As described above with respect to FIG. 1, the application server 66 receives via the web server 64 HTTP requests from either a PC-based web browser 42 capable of supplying full media content (e.g., audio, text, images, and streaming video), or as shown in FIG. 2, a proxy browser 62 configured for serving as an HTTP interface for a user input device, such as a telephone 18, having limited media capabilities (e.g., audio only). In response to receiving the HTTP requests, the voice application server 66 accesses a selected XML document 68 based on parameters specified within the HTTP request (e.g., commands specified within the URL), and based on application state determined from accessing a brownie, assuming the HTTP request specifies a valid session identifier. As described below, the application runtime environment within the voice application server 66 parses the XML tags within the accessed XML document 68, and dynamically generates an HTML page having XML tags that specify media content (e.g., .wav files) and control information for playing the media files by a proxy browser.

The voice application server 66 is configured for accessing database application programming interfaces (API's) 82 to external resources based on prescribed procedures that may be called during parsing of an XML tags in a selected XML document 68. As described below, the application server 66 issues function calls to APIs 82 for accessing the external resources for prescribed operations, enabling the deployment of a robust, scalable calling service. In particular, the application server 66 accesses subscriber profile information from an IP-based database server 84 according to LDAP protocol and can access an IMAP data store 88 for storing and retrieving messages.

Figure 3:
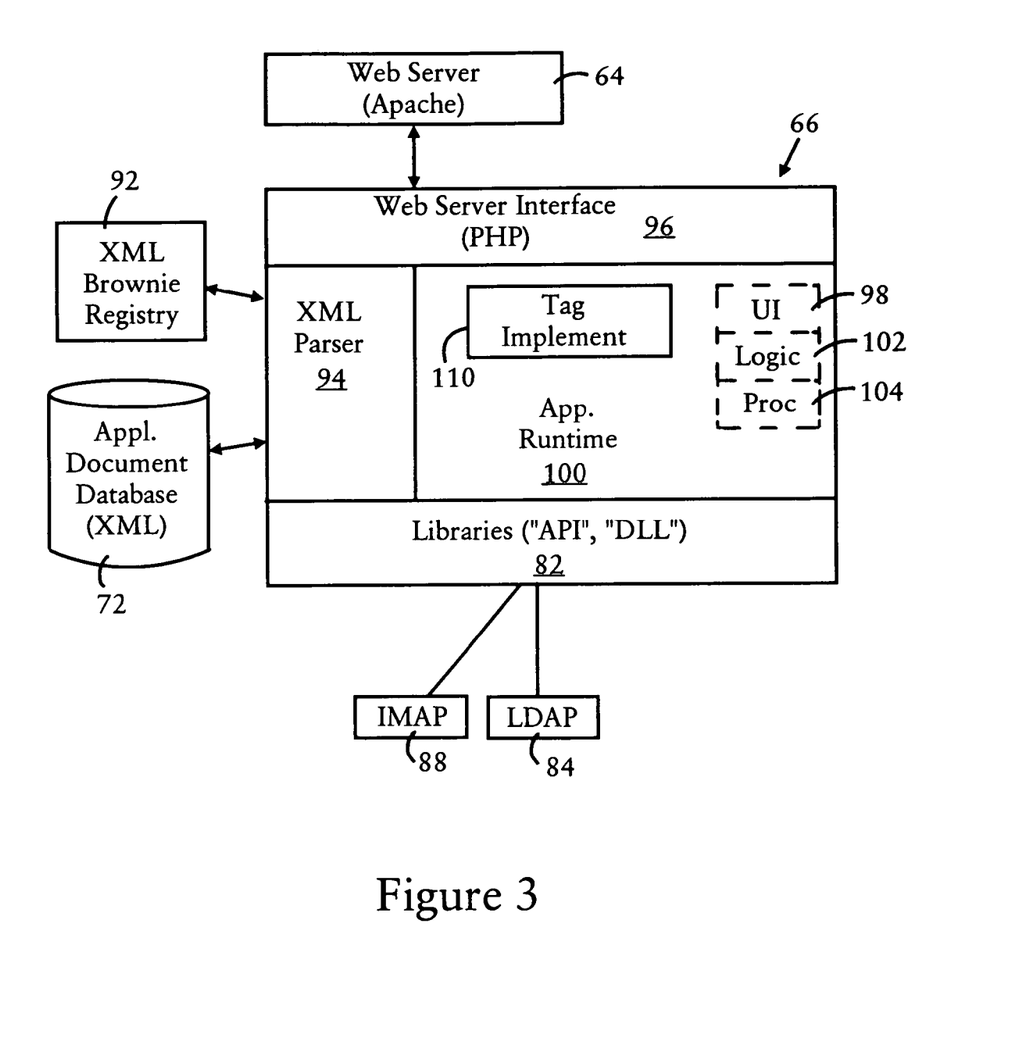
FIG. 3 is a diagram illustrating in detail an application server of FIGS. 1 and 2 according to an embodiment of the present invention.

FIG. 3 is a diagram illustrating in detail the application server 66 according to an embodiment of the present invention. The application server 66 is implemented as a server executing a PHP hypertext processor with XML parsing and processing capabilities, available open source on the Internet at http://www.php.net. As shown in FIG. 3, the server 66 includes an XML parser 94 configured for parsing the application-defining XML documents 68 stored in the XML document database 72, or the XML documents (i.e., "brownies") stored in the registry 92 and configured for specifying the state and attributes for respective user sessions. The application server 66 also includes a high speed interface 96 that establishes a high-speed connection between the application server 66 and the web server 64. For example, the PHP hypertext processor includes a high-speed interface for Apache Web servers.

The application server 66 also includes a runtime environment 100 for execution of the parsed XML documents. As described above, the runtime environment 100 may selectively execute any one of user interface operation 98, a logic operation 102, or a procedure call 104 as specified by the parsed XML document by executing a corresponding set of executable functions based on the rule set for the corresponding operation. In particular, the application runtime environment 100 includes a tag implementation module 110 that implements the XML tags parsed by the XML parser 94. The tag implementation module 110 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 110 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 100 to implement the procedures 104 as specified by the appropriate XML document. The application server 66 may issue a function call to one of a plurality of IP protocol compliant remote resource 84 and 88. For example, the PHP hypertext processor includes executable routines capable of accessing the LDAP data store 84. The data store 84 can include call information such as a calling list linking telephone numbers, e-mail addresses, IP addresses and the names of persons called frequently. The data store can also include white page or yellow page directories. Note that the mechanisms for accessing the services 84, 88 should be established within the application server before use of XML documents that reference those services. Once the services 84, 88 are established, the application runtime environment 100 can perform a function operation by using executable functions specified by a function call rule set.

The arrangement for executing calling services operations will now be described.

Figure 4:
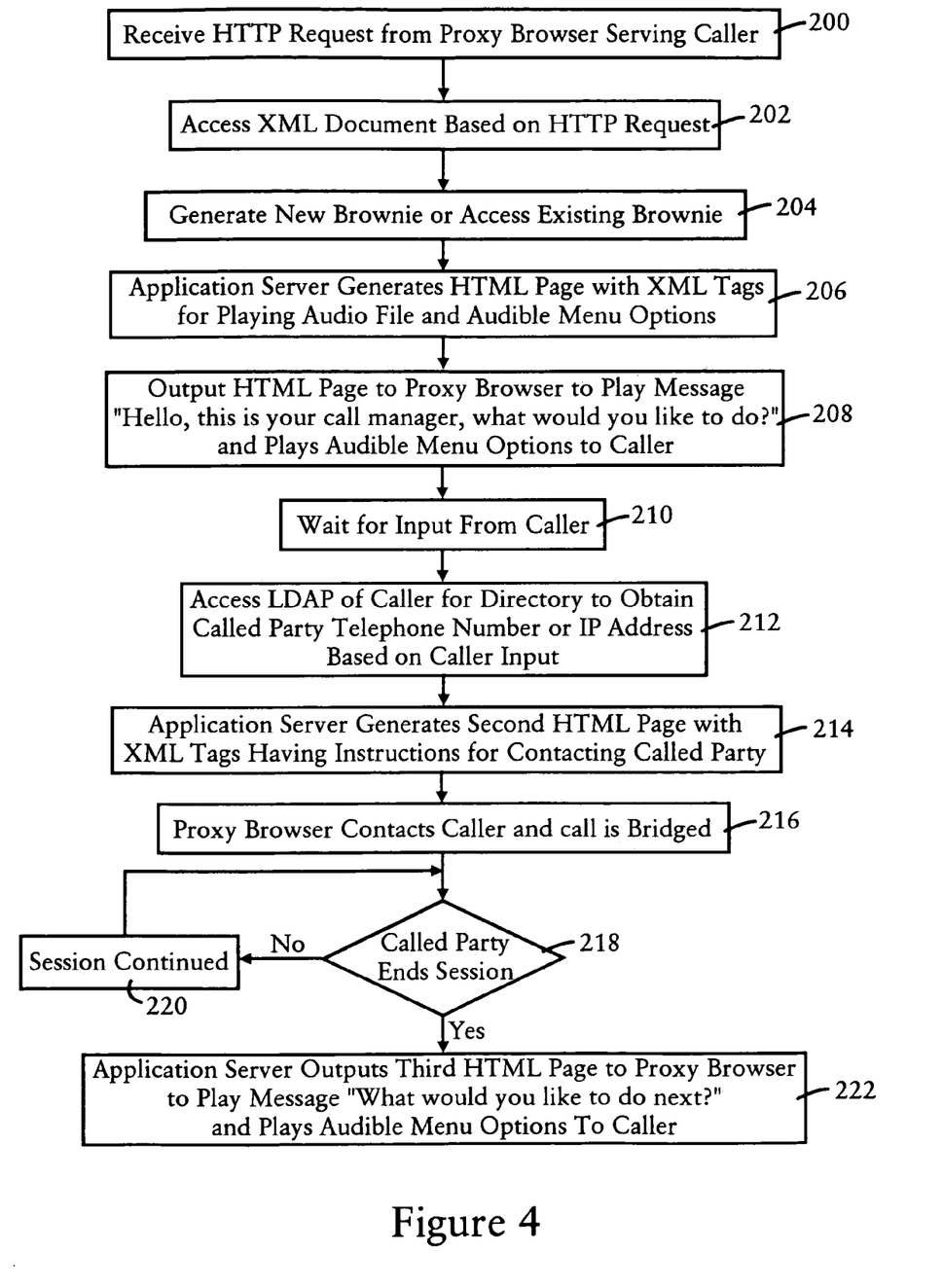
FIG. 4 is a diagram illustrating the execution of a calling service according to an embodiment of the present invention.

FIG. 4 illustrates executing calling services according to an embodiment of the present invention. The steps described in FIG. 4 can be implemented as executable code stored on a computer readable medium (e.g., a hard disk drive, a floppy drive, a random access memory, a read only memory, an EPROM, a compact disc, etc.).

As shown in FIG. 4, the application server 66 receives in step 200 an HTTP request from the proxy browser 62 for initiation of a session for a caller. The application server 66 responds to the HTTP request in step 202 by accessing a selected XML document 68 from the document database 72 that specifies the application operation for calling another party based on the command specified in the HTTP request. The application server 66 then generates a new brownie in step 204 if the caller initiates a new session, else accesses an existing brownie from the registry 92 based on a valid session identifier specified within the HTTP URL request. The application server 66 generates in step 206 an HTML page with XML tags including an audio file (.wav file) specifying playing of the audio file, with prompts. The HTML page is forwarded for execution by the proxy browser 62 in step 208 causes to be played a message such as "Hello, this is your intelligent dial tone, what would you like to do? Press 1 for accessing your call list, press 2 if you know the name, telephone number or e-mail address of the person you want to call, press 3 for white pages", etc.

The application server 66 then waits for an input from the caller in step 210. Based on the input, in step 212, the LDAP data store 84 is accessed to obtain the called party information as defined by the caller. For example, if the caller knows the e-mail address or name but not the telephone number or IP address of a called party, the telephone number or IP address associated with the name or e-mail address is retrieved from the LDAP 84 by the application server 66, eliminating the necessity for existing telephony gate agents such as gatekeepers, call mangers, or virtual switch controllers. If necessary, for a specific calling service such as instant messaging, the application server 66 may also access a registry to determine if the called party is "active" (e.g., currently in a valid session with its corresponding application server).

The application server, in step 214, generates a second HTML page with XML tags having instructions for contacting the called party and outputs the second HTML page to the proxy browser 62. In step 216, the proxy browser establishes a Real Time Protocol (RTP) session with the destination IP address or causes a telephony device (e.g., a PBX) to call the called party and the call is bridged to connect the caller on telephone 18 with the called party on telephone 18' (FIG. 2).

The application sever 66 determines in step 218 if the called party has hung up (ended session) for example, by receiving an HTTP request for the proxy browser 62 indicating the called party has ended the call. If the called party has not ended the session, the session continues in step 220. If the called party has ended the session, in step 222, the application server 66 outputs an HTML page to proxy browser 62 which plays a message such as "What would you like to do next?", with prompts. Thus, in the disclosed embodiment, the caller can connect to multiple destinations from a single call. Similar variations may be utilized upon detecting an interval of inactivity indicating the calling party has been put on "hold".

It can be appreciated that the application server 66 can perform intelligent functions upon receiving calls by using the number dialed, the originating number, and the state of the device associated with the number dialed (such as a busy signal or not answering) and react accordingly. For example if the dialed number is busy, the application server 66 can send a HTML page to the proxy browser 62 to play a messages such as "The called party is not answering. Would you like to do something else?"

Functions of a registry server (not shown) may also be called via an API. For example, if a caller knows the e-mail address of a called party but not the telephone number, upon checking the LDAP 84, there may be three telephone numbers associated with the e-mail address. In this case, the registry server can be accessed by the application server to determine if the called party is active (using telephone 18') and if so, the application server may generate an HTML page for instructing the caller that the called party is on the phone and asks if the caller if he or she wants to contact the called party.

Hence, according to the disclosed embodiment, calling services may be deployed on a platform that is customizable, scalable, and built upon open standards such as Internet protocol. By directly contacting an application server upon picking-up a telephone device, an intelligent system is provided for making telephone calls over an IP network, without "dumb" dial tones and waiting for an initial connection as with existing call routing software.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for executing a voice enabled calling application, the method comprising:
   receiving, by the application server, an HTTP request via an HTTP connection for execution of a voice enabled calling application operation for a caller;
   accessing, by the application server, a selected extensible markup language (XML) document in response to reception of the HTTP request;
   generating, by the application server, based on the XML document, a first HTML page including an audio file having audible prompts for the caller to supply an input;
   accessing, by the application server, a directory based on the input from the caller to obtain called party information regarding the called party; and
   generating, by the application server, a second HTML page having instructions for a computer-based executable resource to contact the called party.

2. The method of claim 1, wherein the step of accessing a directory includes obtaining a telephone number of the called party.

3. The method of claim 1, wherein the step of accessing a directory includes obtaining an IP address of the called party.

4. The method of claim 2, wherein the step of generating the second HTML page includes providing the instructions for calling the called party and bridging the call with the caller.

5. The method of claim 3, wherein the step of generating the second HTML page includes providing the instructions for establishing an IP connection with the called party.

6. The method of claim 1, wherein the step of accessing the directory includes accessing a database server according to the LDAP protocol.

7. The method of claim 1, wherein the directory accessing step includes accessing the directory that includes, as the called party information, a list defined by the caller of persons or businesses as called parties.

8. An application server configured for executing a voice enabled calling application, the application server including:
   a network interface device configured for receiving an HTTP request; and
   an application runtime environment configured for dynamically generating, in response to the HTTP request received by the application server via an HTTP connection, a first hypertext markup language (HTML) document including an audio file having audio prompts for input by a caller, and in response to an input from the caller, for generating a second HTML page having instructions for a computer-based executable resource to contact a called party based on accessing a directory containing information regarding the called party.

9. The application server of claim 8, wherein the directory is a database server and the application runtime environment is configured to access the database server according to the LDAP protocol.

10. The application server of claim 9, wherein the prompts include choices for accessing data in the database server.

11. The application server of claim 8, wherein the directory contains one of a telephone number, an e-mail address, a name, and an IP address.

12. The application server of claim 8, wherein the second HTML page includes instructions for dialing the called party and bridging a call to connect the caller with the called party.

13. The application server of claim 8, wherein the second HTML page includes instructions for establishing an IP connection with the called party.

14. The application server of claim 8, wherein the directory includes a list defined by the caller of persons or businesses as called parties.

15. A computer readable medium having stored thereon sequences of instructions for executing a voice enabled calling application, the sequences of instructions including instructions for performing the steps of:
   receiving, by the application server, an HTTP request via an HTTP connection for execution of a voice enabled calling application operation for a caller;
   accessing, by the application server, a selected extensible markup language (XML) document in response to reception of the HTTP request;
   generating, by the application server, based on the XML document, a first HTML page including an audio file having audible prompts for the caller to supply an input;
   accessing, by the application server, a directory based on the input from the caller to obtain called party information regarding the called party; and
   generating, by the application server, a second HTML page having instructions for a computer-based executable resource to contact the called party.

16. The medium of claim 15, wherein the step of accessing a directory includes obtaining a telephone number of the called party.

17. The medium of claim 15, wherein the step of accessing a directory includes obtaining an IP address of the called party.

18. An application server configured for executing a voice enabled calling application, the application server including:
   a hypertext transport protocol (HTTP) interface device for receiving an HTTP request, via an HTTP connection, specifying execution of a prescribed messaging application operation for a subscriber; and
   means for dynamically generating in the application server, in response to the HTTP request, a first hypertext markup language (HTML) document including an audio file having audible prompts for input by a caller, and in response to an input from the caller, for generating a second HTML page having instruction for a computer-based executable resource to contact a called party based on accessing a directory containing information regarding the called party.

19. The application server of claim 18, wherein the directory is a database server and the application runtime environment is configured to access the database server according to the LDAP protocol.

20. The application server of claim 19, wherein the prompts include choices for accessing data in the database server.

21. The application server of claim 18, wherein the second HTML page includes instructions for dialing the called party and bridging a call to connect the caller with the called party.

22. The application server of claim 18, wherein the directory contains one of a telephone number, an e-mail address, a name, and an IP address.

23. The application server of claim 18, wherein the second HTML page includes instructions for establishing an IP connection with the called party.

24. The application server of claim 18, wherein the directory includes a list defined by the caller of persons or businesses as called parties.

* * * * *